(12) United States Patent
Kunz et al.

(10) Patent No.: US 11,192,534 B2
(45) Date of Patent: Dec. 7, 2021

(54) BRAKE-FORCE SIMULATOR FOR A MOTOR VEHICLE

(71) Applicant: Robert Bosch GmbH, Stuttgart (DE)

(72) Inventors: Armin Kunz, Ditzingen (DE); Juergen Haslsteiner, Altusried (DE); Matthias Kistner, Bretzfeld (DE); Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/081,320

(22) PCT Filed: Feb. 15, 2017

(86) PCT No.: PCT/EP2017/053340
§ 371 (c)(1),
(2) Date: Aug. 30, 2018

(87) PCT Pub. No.: WO2017/167495
PCT Pub. Date: Oct. 5, 2017

(65) Prior Publication Data
US 2019/0061720 A1    Feb. 28, 2019

(30) Foreign Application Priority Data

Apr. 1, 2016    (DE) .......................... 102016205407.4

(51) Int. Cl.
*B60T 8/40*    (2006.01)
(52) U.S. Cl.
CPC ............ *B60T 8/409* (2013.01); *B60T 8/4086* (2013.01)

(58) Field of Classification Search
CPC ....... B60T 8/4081; B60T 8/4086; B60T 8/409
See application file for complete search history.

(56) References Cited

U.S. PATENT DOCUMENTS

| | | | | |
|---|---|---|---|---|
| 3,302,481 | A * | 2/1967 | Kenrick | B60T 13/52 74/512 |
| 5,516,085 | A * | 5/1996 | Piepenstock | F16F 1/06 267/148 |
| 5,729,979 | A | 3/1998 | Shaw et al. | |
| 6,347,518 | B1 * | 2/2002 | Kingston | B60T 7/042 60/552 |
| 8,297,715 | B2 * | 10/2012 | Nishikawa | B60T 8/3225 303/9.64 |

(Continued)

FOREIGN PATENT DOCUMENTS

| | | |
|---|---|---|
| CN | 203300522 U | 11/2013 |
| DE | 19651153 A1 | 6/1998 |

(Continued)

OTHER PUBLICATIONS

International Search Report dated Apr. 19, 2017 of the corresponding International Application PCT/EP2017/053340 filed Feb. 15, 2017.

*Primary Examiner* — Thomas J Williams
(74) *Attorney, Agent, or Firm* — Norton Rose Fulbright US LLP; Gerard Messina

(57) ABSTRACT

A brake-force simulator for a motor vehicle includes a piston operatively connectible to an operable brake pedal that is guided in an axially displaceable manner in a cylinder; and at least one elastomer spring element situated in the cylinder, which acts with a spring force counter to the movement of the piston in one direction.

20 Claims, 3 Drawing Sheets

(56) References Cited

U.S. PATENT DOCUMENTS

| | | | |
|---|---|---|---|
| 9,139,168 B2* | 9/2015 | Jeon | B60T 7/042 |
| 2003/0034599 A1* | 2/2003 | Devambe | B60T 11/28 |
| | | | 267/166 |
| 2005/0082909 A1* | 4/2005 | Constantakis | B60T 8/3255 |
| | | | 303/20 |
| 2010/0078989 A1* | 4/2010 | Kato | B60T 7/042 |
| | | | 303/113.4 |
| 2012/0043806 A1* | 2/2012 | Linkenbach | B60T 8/4872 |
| | | | 303/113.1 |
| 2013/0233118 A1* | 9/2013 | Khan | G05G 1/44 |
| | | | 74/514 |
| 2014/0138888 A1* | 5/2014 | Kim | G05G 5/03 |
| | | | 267/140.13 |
| 2015/0101447 A1* | 4/2015 | Kim | B60T 8/409 |
| | | | 74/512 |
| 2015/0166023 A1* | 6/2015 | Ryu | B60T 7/042 |
| | | | 303/3 |
| 2016/0031424 A1* | 2/2016 | Weh | B60T 8/409 |
| | | | 60/533 |

FOREIGN PATENT DOCUMENTS

| | | | | |
|---|---|---|---|---|
| DE | 102016208942 A1 | * | 11/2017 | B60T 8/3255 |
| EP | 1526050 A1 | | 4/2005 | |
| EP | 2168824 A1 | | 3/2010 | |
| EP | 2548776 A2 | * | 1/2013 | B60T 8/409 |
| FR | 2756797 A1 | * | 6/1998 | B60T 8/4086 |
| JP | 2006256408 A | | 9/2006 | |
| JP | 2009262682 A | | 11/2009 | |
| JP | 2010000925 A | * | 1/2010 | |
| JP | 2010000925 A | | 1/2010 | |
| JP | 2014073735 A | | 4/2014 | |
| WO | 2015104122 A1 | | 7/2015 | |

\* cited by examiner

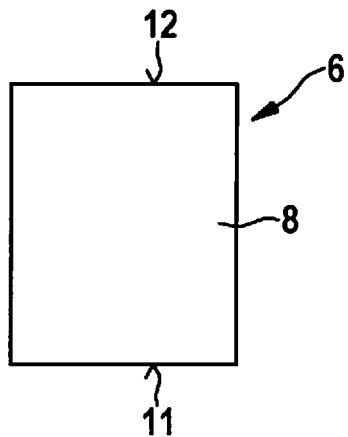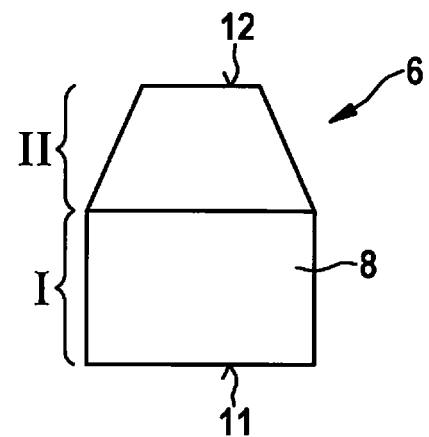
Fig. 2A  Fig. 3A
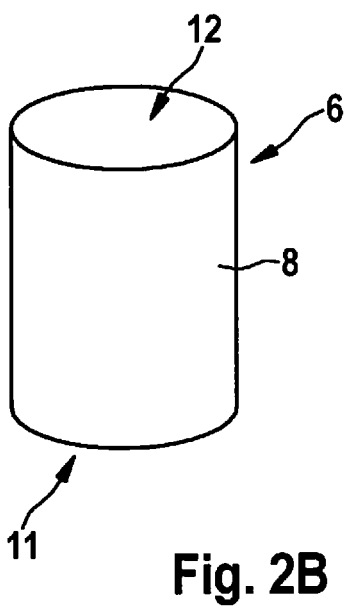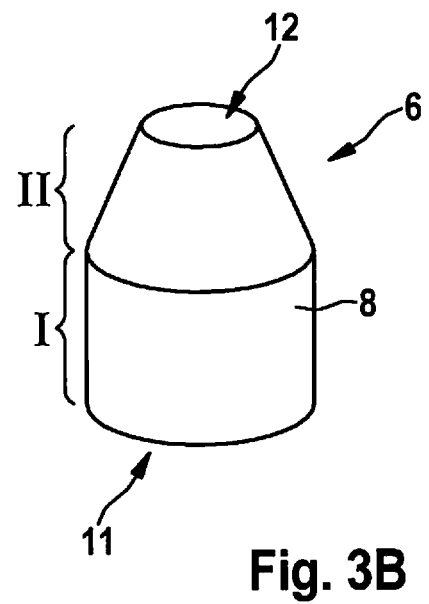
Fig. 2B  Fig. 3B

BRAKE-FORCE SIMULATOR FOR A MOTOR VEHICLE

CROSS-REFERENCE TO RELATED APPLICATIONS

The present application is the national stage of International Pat. App. No. PCT/EP2017/053340 filed Feb. 15, 2017, and claims priority under 35 U.S.C. § 119 to DE 10 2016 205 407.4, filed in the Federal Republic of Germany on Apr. 1, 2016, the content of each of which are incorporated herein by reference in their entireties.

FIELD OF THE INVENTION

The present invention relates to a brake-force simulator for a motor vehicle, the simulator including a piston operatively connected/operatively connectible to an operable brake pedal of the motor vehicle and guidable in an axially displaceable manner in a cylinder in which is situated at least one spring element acting with a spring force counter to the movement of the piston in one direction. The present invention also relates to a braking device having a brake-force simulator of this kind.

BACKGROUND

Brake-force simulators and braking devices are known from the related art. In hydraulic brake systems of motor vehicles master brake cylinders are used in order to translate a braking force mechanically applied by the driver into the hydraulic brake system. For this purpose, the brake pedal device is coupled with a piston that is supported in the master brake cylinder in a displaceable manner. The displacement produces a hydraulic pressure in a first pressure chamber, which is then built up in the brake circuit connected to the master brake cylinder in order to actuate hydraulically one or multiple wheel brakes of the braking device. Current developments provide for the braking force in wheel brakes to be no longer provided directly by the driver, but rather by electrically controllable actuators, which then provide the respective braking force electromotively or electrohydraulically on the wheel brakes. In such a brake system, in which the direct mechanical/hydraulic coupling between the brake pedal and the wheel brake is interrupted, there is no sensible feedback for the driver on the brake pedal about the braking force the driver is applying. It is thus particularly difficult for the driver to operate the brake pedal sensitively. So that the driver does not lose the feeling for the braking process, brake-force simulators, which are also called pedal-feeling simulators, are known, which give the driver a feeling or a feedback about the braking force the driver initiated in spite of the separation of the direct connection. Known brake-force simulators have a spring element that counteracts the braking force applied by the driver. For this purpose, the spring element is assigned to a piston that is displaceable by the brake pedal so that the driver moves the piston counter to the spring force of the spring element when operating the brake pedal and thereby tensions the spring element. The spring element is usually designed as a metallic helical spring. Consequently, the counterpressure increases noticeably for the driver with the travel distance of the piston, which gives him a feeling for the braking process.

SUMMARY

An advantage of a brake-force simulator according to an example embodiment of the present invention is achievement of an improved force-travel characteristic curve of the brake-force simulator, which conveys to the driver an improved haptic feedback in a braking process. According to the present invention, this is achieved by the fact that the spring element takes the form of an elastomer element. This makes it possible to achieve desired elastic properties of the spring element in an even more targeted manner, in particular also through different geometries of the spring element, which are advantageous for the braking sensibility. The development as an elastomer element makes it possible to implement these variants in a cost-effective manner and with low manufacturing effort. The elastomer element can replace an already existing spring element in a simple manner so that it is even possible to adapt a brake-force simulator retroactively.

It is preferably provided that the elastomer element is made at least essentially from ethylene propylene diene rubber and/or from polyurethane. The use of polyurethane achieves an advantage that the haptic feedback to a driver remains constant even at higher temperature changes. The material is comparatively insensitive to temperature. Furthermore, when compressed, the elastomer element made of polyurethane has only very little lateral expansion such that the use of the elastomer element made of polyurethane has advantages in terms of the necessary installation space. Ethylene propylene diene rubber, by contrast, has the advantage of a cost-effective manufacture and high load-bearing capacity.

According to a preferred example embodiment of the present invention, the elastomer element is developed essentially cylindrically and to be disposed coaxially in the cylinder. The longitudinal axis of the elastomer element thus extends in the direction of movement of the piston so that the elastomer element is compressed axially when the piston is actuated and is radially expanded, if indicated. The elastomer element is also advantageously guided or is guidable in the cylinder so that the elastomer element is securely prevented from jamming. This makes the manufacture of the elastomer element particularly simple and cost-effective and guards against incorrect installation of the elastomer element in the brake-force simulator. It is optionally provided that a conventional helical spring is additionally associated with the elastomer element for reinforcement, which further advantageously influences the force-travel characteristic curve of the brake-force simulator.

According to an example embodiment, the elastomer element abuts with a first end in planar fashion against a bottom of the cylinder. The elastomer element thus has a large foot print on the bottom, on which it is supported, which makes it possible to transmit in particular great forces from the piston to the elastomer element.

According to an example embodiment, a second end of the elastomer element is designed to be planar and orthogonal to the longitudinal axis of the elastomer element. The elastomer element is thus developed overall as a cylinder. The front side of the first end is expediently designed to be planar and orthogonal with respect to the longitudinal axis of the elastomer element in order to ensure a stable contact surface.

According to an example embodiment, the second end is developed frustoconically. When the piston impinges on the elastomer element, this yields an advantageous deformation or an advantageous flow of force that optimizes the force-travel characteristic curve of the brake-force simulator. This in particular achieves the result that at the beginning of the movement of the piston against the force of the spring element a lesser spring force is counteracting, which increases with increased length of travel.

According to an alternative example embodiment, the second end of the elastomer element is developed spherically. As a result, there is in particular no planar bearing surface, but rather initially a bearing point at which the piston touches the spherical shape. This likewise results in an advantageous force-travel characteristic curve of the brake-force simulator. Advantageously, the second end has a cylindrical projection, on the end of which the spherical shape is developed. This further influences the behavior of the brake-force simulator advantageously. In particular, this results in a first axial stop face on the spherical shape and a second axial stop face on the other end of the elastomer element, which will be explained in more detail later.

According to an alternative example embodiment, the second end of the elastomer element has a depression, in particular a concavely developed arch. The elastomer element thus has a ring-shaped contact surface for contacting the piston. It is in particular provided that the elastomer element has a radial tapering below the depression so that a disk-shaped or plate-shaped second end of the elastomer element is formed. The plate shape achieves the result that the initially counteracting spring force is especially small and is then suddenly or abruptly increased with increased travel distance of the piston, when the plate-shaped segment was maximally deformed.

According to an example embodiment, the elastomer element has on its second end a first axial stop face and at least a second axial stop face for the piston. This is achieved for example in that a projection is developed on the front side of the second end, which projects from the front side and has a diameter that is smaller than that of the rest of the elastomer element, as already mentioned previously. This results in a first axial stop face on the tip of the projection and a second axial stop face on the free front side or the remaining free front side on the second end of the elastomer element. This achieves the result for example that the piston, when it is operated, initially is only able to exert a force on the elastomer element via the first axial stop face and with increasing distance traveled at some point strikes the second axial stop face and is then able to transmit a further force via the latter as well. The spring force counteracting the piston increases accordingly at the point in time at which the piston also contacts the second axial stop face. This allows for the realization of an abrupt increase of the spring force counteracting the piston.

Alternatively or additionally, it is preferably provided that the piston has a first axial stop for the first axial stop face and a second axial stop for the second axial stop face. The formation of defined axial stops for the axial stop faces precisely defines the ratio between travel distance and counteracting spring force, which yields further advantages regarding the force-travel characteristic curve.

For this purpose, it is particularly provided that the first axial stop and the second axial stop and/or the first axial stop face and the second axial stop face are respectively developed to be axially set apart from one another. Consequently, in particular the second axial stop face and/or the second axial stop is situated in an axially offset manner with respect to the first axial stop face or the second axial stop so that the second axial stop and the second axial stop face are only touched at the desired point in time or at a specific displacement travel of the piston.

According to an example embodiment, the elastomer element is developed as a sleeve element and thus has an axially continuous cavity. This saves material and weight, the spring force of the elastomer element thereby reduced still being sufficient depending on the choice of the material of the elastomer element and depending on the case of application. Optionally, the additional helical spring already mentioned previously is disposed in the cavity of the sleeve element.

According to an example embodiment of the present invention, a braking device includes the brake-force simulator of the present invention. This yields the advantages already mentioned.

Further advantages and preferred features and feature combinations result from the description herein as well as from the claims.

In the following, the present invention is elucidated in greater detail with reference to the drawings.

BRIEF DESCRIPTION OF THE DRAWINGS

FIGS. 2A and 2B illustrate the elastomer element according to an example embodiment of the present invention.

FIGS. 3A and 3B illustrate the elastomer element according to another example embodiment of the present invention.

DETAILED DESCRIPTION

Figure 1:
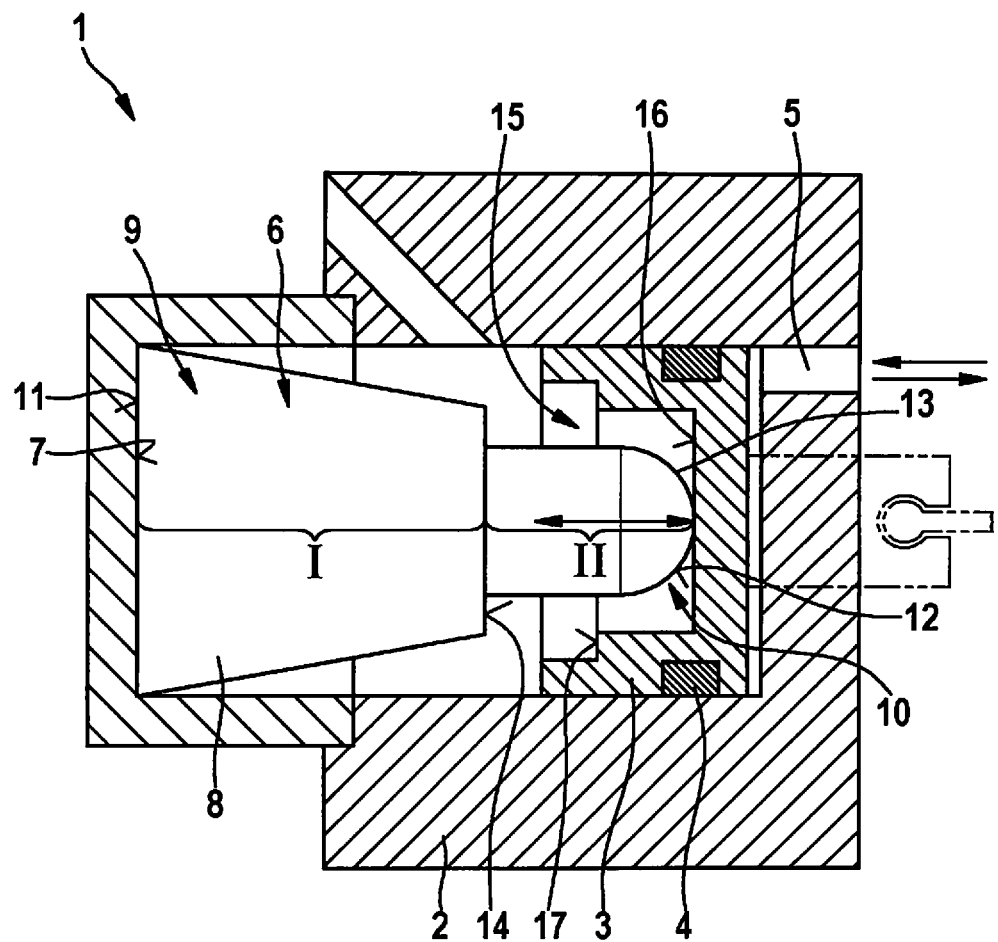
FIG. 1 illustrates, in a simplified longitudinal sectional view, a brake-force simulator having an elastomer element, according to an example embodiment of the present invention.

FIG. 1 shows, in a simplified longitudinal sectional view, a brake-force simulator 1 of a braking device of a motor vehicle that is not shown in more detail here. Brake-force simulator 1 is designed to be inserted into the braking device developed as a hydraulically operating system. For this purpose, brake force simulator 1 has a cylinder 2, in which a piston 3 is situated in an axially displaceable manner. Piston 3 is additionally situated, guided by at least one sealing ring 4, radially on the periphery close on the inner wall of cylinder 2. It is possible to convey hydraulic medium into the cylinder via a pressure connection 5, whereby piston 3 is axially displaced into cylinder 2. Pressure connection 5 is hydraulically coupled for example to a master brake cylinder of the braking device. Alternatively, it is advantageously provided that piston 3, as shown by dashed lines, is mechanically coupled with a brake pedal of the braking device so that piston 3 is shifted in cylinder 2 by mechanical actuation.

Furthermore, a spring element 6 is situated in cylinder 2, which rests on the one hand on a bottom 7 of cylinder 2 and on the other hand on piston 3 so that it is able to be braced elastically between these two. If the driver of the motor vehicle applies a braking force hydraulically or mechanically onto piston 3, then piston 3 is moved against spring element 6 so that the spring force provided by spring element 6 counteracts the movement of piston 3. Spring element 6 is here developed as an elastomer element 8, which is manufactured in particular from polyurethane or from ethylene propylene diene rubber.

Elastomer element 8 is designed in the shape of a cylinder and has, when seen in the longitudinal section, a first section I having a frustoconical contour and a second section II having a frustospherical contour. First section I forms a first end 9, which is supported on cylinder 2, on its bottom 7. The second section II protruding from first section I forms a second end 10 that is assigned to piston 3.

Front side 11 of elastomer element 8 is developed on first end 9 to be planar and orthogonal to the longitudinal axis of the elastomer element 8 so that it rests by the first end 9 in a planar manner on the bottom 7 of cylinder 2. The other front side 12 of elastomer element 8, which is associated with piston 3, is designed to be spherical and thus abuts in the initial position shown in FIG. 1 against piston 3 only with small surface or in a punctiform manner. Front side 12 thus forms a first axial stop face 13, which increases in size as a function of the contact pressure of piston 3 or of the displacement travel of piston 3. Because section II has altogether a smaller diameter than first section I of elastomer element 8, the latter additionally forms a second axial stop face 14, which lies radially outside of first stop face 13.

Piston 3 has on its side facing elastomer element 8 a stepped depression, which has at the center a first axial stop 16, and radially outside additionally a second axial stop 17, which is associated with second axial stop face 14 in such a way that, when piston 3 is shifted sufficiently far in the direction of elastomer element 8, the second axial stop 17 strikes the second axial stop face 14.

All in all, this provides a pedal-force simulator 1, which has an advantageous force-travel characteristic curve and moreover is designed to save space and ensures a long service life.

FIGS. 2-4 show different alternative exemplary embodiments of elastomer element 8, respectively in a lateral view and in a perspective view.

FIGS. 2A and 2B also show elastomer element 8 according to a first alternative exemplary embodiment, in which elastomer element 8 is designed on the whole as a cylindrical body. This represents a particularly cost-effective example embodiment. Piston 3 is expediently adapted to the shape of elastomer element 8 in such a way that front side 12 of the latter comes to contact piston 3 in a planar manner or already abuts against it in a prestressed manner in the initial position.

FIGS. 3A and 3B show a second alternative exemplary embodiment, in which first section I is designed cylindrically and second section II of elastomer element 8 is designed frustoconically. Elastomer element 8 thus likewise has a planar end face 12 for abutting against piston 3, but, due to the frustoconical design of section II, has an improved spring force-travel characteristic curve of elastomer element 8, which thus initially uses only a slight spring force in particular when piston 3, starting from its initial position as shown in FIG. 1, travels only a short distance.

Figure 4A:
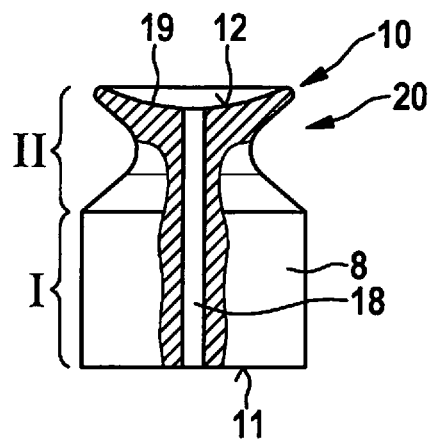
FIGS. 4A and 4B includes lateral and perspective views of the elastomer element according to another example embodiment of the present invention.
Figure 4B:
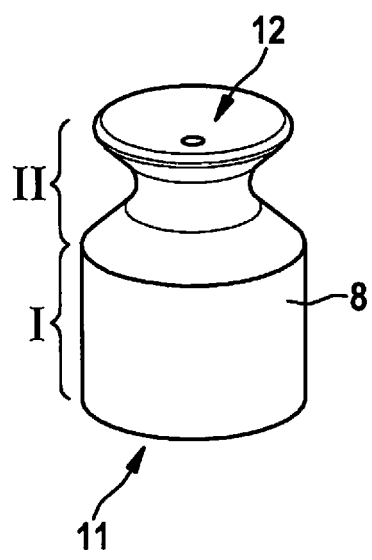

FIGS. 4A and 4B show another exemplary embodiment of elastomer element 8, which according to this exemplary embodiment is designed to be sleeve-shaped having an axially continuous cavity 18. First section I is again designed cylindrically. Second section II has on its front side 12 a depression 19 in the shape of a concave vault. Between section I and front side 12, elastomer element 8 additionally has a tapered diameter or radial tapering 20, as a result of which end 10 facing piston 3 obtains the shape of a plate spring. This results in additional advantageous properties of elastomer element 8 in pedal-force simulator 1, in particular with respect to the spring force-travel characteristic curve. Cavity 18 can be used, for example, to situate and guide an additional helical spring in pedal-force simulator 1, which provides an additional spring force acting on piston 3.

What is claimed is:

1. A brake-force simulator for a motor vehicle, the simulator comprising:
   a cylinder;
   an elastomer spring; and
   a single-piece piston operatively connected or connectible to an operable brake pedal of the motor vehicle and that is arranged for being guided axially displaceably in the cylinder in a displacement direction towards the elastomer spring;
   wherein:
   the elastomer spring is arranged in the cylinder to apply a spring force against movement of the piston when the piston is displaced in the displacement direction towards the elastomer spring;
   the elastomer spring includes a first section and a second section;
   the first section of the elastomer spring includes:
      a first planar surface that is at a first side of the first section and that faces away from the piston and abuts against a surface of the cylinder towards which the piston faces; and
      a second planar surface that is at a second side of the first section, opposite the first side of the first section, and that is perpendicular to the displacement direction in which the piston is displaceable towards the elastomer spring;
   the second section of the elastomer spring extends from the second planar surface of the first section towards an end face of the second section that faces the piston;
   the piston includes a first stop end face and a second stop end face;
   the piston is arranged relative to the elastomer spring such that, when the piston is displaced in the displacement direction towards the elastomer spring:
      at a first stage of the displacement in which an entirety of the piston is displaced in unison in the displacement direction, the first stop end face abuts against the end face of the second section of the elastomer spring without abutment of the second stop end face of the piston against the elastomer spring; and
      at a subsequent second stage of the displacement that occurs by continuation of the displacement after the first stop end face has abutted against the end face of the second section of the elastomer spring, the second stop end face of the piston abuts against the second planar surface of the elastomer spring;
   either or both of the following:
      (1) the elastomer spring is a single-piece elastomer spring; and
      (2) the first stop end face and the second stop end face of the piston are axially offset from each other; and
   the cylinder includes a channel via which a hydraulic medium is suppliable into the cylinder to shift the single-piece piston.

2. The brake-force simulator of claim 1, wherein the elastomer spring is made at least essentially from at least one of ethylene propylene diene rubber and polyurethane.

3. The brake-force simulator of claim 1, wherein the elastomer spring is at least essentially cylindrical and is positioned so that the elastomer spring and the cylinder share a same central longitudinal axis.

4. The brake-force simulator of claim 1, wherein the end face of the second section is spherically shaped.

5. The brake-force simulator of claim 1, wherein the end face of the second section is radially interior to the second planar surface of the first section.

6. The brake-force simulator of claim 5, wherein the first stop end face is radially interior to the second stop end face, and the first stop end face, with respect to the direction by which the piston is displaceable towards the elastomer spring, is axially behind the second stop end face.

7. The brake-force simulator of claim 6, wherein the end face of the second section is, with respect to the direction by which the piston is displaceable towards the elastomer spring, axially behind the first and second planar surfaces of the elastomer spring.

8. The brake-force simulator of claim 1, wherein at least a part of the second section of the elastomer spring is frusto-spherical.

9. The brake-force simulator of claim 8, wherein at least a region of the first section that terminates with the second planar surface is frusto-conical.

10. The brake-force simulator of claim 1, wherein:
(i) an exterior of the first section gradually tapers radially inwards from the first planar surface to a radially exterior edge of the second planar surface; and
(ii) an exterior of at least a part of the second section of the elastomer spring is cylindrical and extends axially without radially tapering.

11. A motor vehicle braking device comprising:
a brake-force simulator; and
a brake pedal that is operatively connected to the brake-force simulator;
wherein:
the brake-force simulator includes:
a cylinder;
an elastomer spring; and
a single-piece piston operatively connected or connectible to the operable brake pedal of the motor vehicle and that is arranged for being guided axially displaceably in the cylinder in a displacement direction towards the elastomer spring;
the elastomer spring is arranged in the cylinder to apply a spring force against movement of the piston when the piston is displaced in the displacement direction towards the elastomer spring;
the elastomer spring includes a first section and a second section;
the first section of the elastomer spring includes:
a first planar surface that is at a first side of the first section and that faces away from the piston and abuts against a surface of the cylinder towards which the piston faces; and
a second planar surface that is at a second side of the first section, opposite the first side of the first section, and that is perpendicular to the displacement direction in which the piston is displaceable towards the elastomer spring;
the second section of the elastomer spring extends from the second planar surface of the first section towards an end face of the second section that faces the piston;
the piston includes a first stop end face and a second stop end face;
the piston is arranged relative to the elastomer spring such that, when the piston is displaced in the displacement direction towards the elastomer spring:
at a first stage of the displacement in which an entirety of the piston is displaced in unison in the displacement direction, the first stop end face abuts against the end face of the second section of the elastomer spring without abutment of the second stop end face of the piston against the elastomer spring; and
at a subsequent second stage of the displacement that occurs by continuation of the displacement after the first stop end face has abutted against the end face of the second section of the elastomer spring, the second stop end face of the piston abuts against the second planar surface of the elastomer spring;
either or both of the following:
(1) the elastomer spring is a single-piece elastomer spring; and
(2) the first stop end face and the second stop end face of the piston are axially offset from each other; and
the motor vehicle braking device includes a hydraulic medium source and the cylinder includes a channel connected to the hydraulic medium source via which a hydraulic medium is suppliable from the hydraulic medium source into the cylinder.

12. The motor vehicle braking device of claim 11, wherein the elastomer spring is the single-piece elastomer spring.

13. The motor vehicle braking device of claim 11, wherein the first stop end face and the second stop end face of the piston are axially offset from each other.

14. The motor vehicle braking device of claim 11, wherein:
(i) an exterior of the first section gradually tapers radially inwards from the first planar surface to a radially exterior edge of the second planar surface; and
(ii) an exterior of at least the part of the second section of the elastomer spring is cylindrical and extends axially without radially tapering.

15. The motor vehicle braking device of claim 11, wherein a surface of the end face of the second section that faces the piston convexly curves from a center-point of the end face of the second section radially outwards and in a direction away from the single-piece piston.

16. A brake-force simulator for a motor vehicle, the simulator comprising:
a cylinder;
an elastomer spring;
a piston operatively connected or connectible to an operable brake pedal of the motor vehicle and that is arranged for being guided axially displaceably in the cylinder in a displacement direction towards the elastomer spring so that piston thereby abuts against the elastomer spring, with the elastomer spring thereby applying a first spring force against the piston; and
a helical spring arranged inside a bore that extends within the elastomer spring in the displacement direction in which the piston is displaceable towards the elastomer spring to provide a reinforcing second spring force against the piston;
wherein the elastomer spring, helical spring, and the piston are arranged so that, when the piston is displaced in the displacement direction, the piston initially abuts against the elastomer spring prior to application by the helical spring of the reinforcing second spring force against the piston, and, the helical spring applies the reinforcing second spring force subsequently with continued displacement of the piston in the displacement direction.

17. The brake-force simulator of claim 16, wherein a first end of the elastomer spring is a planar surface that abuts against a bottom of the cylinder.

18. The brake-force simulator of claim 16, wherein an end of the elastomer spring that faces the piston has a depression.

19. The brake-force simulator of claim 18, wherein the depression forms a concavely shaped vault.

20. A brake-force simulator for a motor vehicle, the simulator comprising:
- a cylinder;
- an elastomer spring; and
- a piston operatively connected or connectible to an operable brake pedal of the motor vehicle and that is arranged for being guided axially displaceably in the cylinder in a displacement direction towards the elastomer spring;

wherein:
- the piston:
  - is a one-piece piston such that an entirety of piston is displaced in unison whenever the piston is displaced in the displacement direction; and
  - includes a stop end face that faces the elastomer spring in the displacement direction towards the elastomer spring in which the piston is displaceable; and
- the elastomer spring:
  - is arranged in the cylinder to apply a spring force against movement of the piston when the piston is displaced in the direction towards the elastomer spring; and
  - includes a concavely shaped end face that faces the stop end face of the piston and is arranged relative to the piston such that when the piston is displaced in the displacement direction, the piston initially abuts against an outer rim of the concavely shaped end face without abutting against an interior region of the concavely shaped end face that is radially interior to the outer rim of the concavely shaped end face and, subsequently, with continued displacement of the piston in the displacement direction, the piston abuts against the interior region of the concavely shaped end face.

* * * * *